US 11,648,943 B2

(12) United States Patent
Lee (10) Patent No.: US 11,648,943 B2
(45) Date of Patent: May 16, 2023

(54) APPARATUS AND METHOD FOR CONTROLLING LANE FOLLOWING (71) Applicants: HYUNDAI MOTOR COMPANY, Seoul (KR); KIA MOTORS CORPORATION, Seoul (KR)

(72) Inventor: Jin Bong Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 242 days.

(21) Appl. No.: 17/067,998

(22) Filed: Oct. 12, 2020

(65) Prior Publication Data

US 2021/0107480 A1 Apr. 15, 2021

(30) Foreign Application Priority Data

Oct. 11, 2019 (KR) ........................ 10-2019-0126137

(51) Int. Cl.
*B60W 30/12* (2020.01)
*B60W 40/072* (2012.01)
*B60W 10/20* (2006.01)
*G06V 20/58* (2022.01)
*G06V 20/56* (2022.01)

(52) U.S. Cl.
CPC ............ *B60W 30/12* (2013.01); *B60W 10/20* (2013.01); *B60W 40/072* (2013.01); *G06V 20/584* (2022.01); *G06V 20/588* (2022.01); *B60W 2554/40* (2020.02); *B60W 2554/801* (2020.02); *B60W 2710/202* (2013.01)

(58) Field of Classification Search
None
See application file for complete search history.

(56) References Cited

U.S. PATENT DOCUMENTS

| | | | |
|---|---|---|---|
| 9,393,998 B2* | 7/2016 | Clarke | B62D 15/025 |
| 2012/0022739 A1* | 1/2012 | Zeng | B60W 30/12 |
| | | | 348/148 |
| 2015/0354976 A1* | 12/2015 | Ferencz | G06V 20/588 |
| | | | 382/104 |
| 2017/0197549 A1* | 7/2017 | Vladimerou | G06N 5/04 |
| 2017/0316684 A1* | 11/2017 | Jammoussi | G08G 1/096716 |
| 2018/0024562 A1* | 1/2018 | Bellaiche | G06V 20/588 |
| | | | 701/26 |
| 2018/0181820 A1* | 6/2018 | Ide | B60W 30/143 |
| 2018/0204075 A1* | 7/2018 | Kumano | G06V 20/588 |
| 2019/0100200 A1* | 4/2019 | McNew | B60W 30/18145 |
| 2020/0317194 A1* | 10/2020 | Yan | B60W 30/143 |

* cited by examiner

Primary Examiner — Christian Chace
Assistant Examiner — Scott R Jagolinzer
(74) Attorney, Agent, or Firm — Lempia Summerfield Katz LLC (57) ABSTRACT An apparatus and method for controlling lane following include acquiring front image information through a camera installed at an ego-vehicle during travel of the ego-vehicle; setting a target trajectory of the ego-vehicle using line information and travel information of a preceding vehicle extracted based on the image information; and calculating a steering torque to control steering of the ego-vehicle along the set target trajectory.

17 Claims, 4 Drawing Sheets

APPARATUS AND METHOD FOR CONTROLLING LANE FOLLOWING

This application claims the benefit of and priority to Korean Patent Application No. 10-2019-0126137 filed on Oct. 11, 2019, the entire content of which is hereby incorporated by reference as if fully set forth herein.

BACKGROUND

Field of the Disclosure

The present disclosure relates to an apparatus and method for controlling lane following.

Discussion of the Related Art

In accordance with recent development of vehicle technologies, various control systems capable of securing stability of a vehicle and convenience of a driver have also been developed.

Among such various control systems, a lane following assist (LFA) system is a system configured to control steering of a vehicle by recognizing lines at both sides of a lane by a camera during travel of the vehicle in the lane. Such a system operates a steering wheel in accordance with a profile of an associated roadway and a traveling state of the vehicle such that the vehicle follows a centerline of the lane in an autonomous manner.

However, conventional LFA technologies have a problem in that vehicle steering control may be frequently released on a roadway having a poor line state (for example, disappearance of lane marking lines at a crossroads or other lane marking line damage/disappearance) because the conventional LFA technologies control vehicle traveling based on lane marking lines. In order to maintain continuance of vehicle traveling control while eliminating such a problem, a scheme for performing steering control through following of a travel trajectory of a preceding vehicle when lane marking lines cannot be recognized has been proposed.

However, the above-mentioned scheme has a limitation in that there may be a collision danger of a subject vehicle with surrounding vehicles because the subject vehicle unintentionally performs lane change when the preceding vehicle performs lane change, and the above-mentioned scheme may be difficult to be applied to a curved path because the travel trajectory of the preceding vehicle is limited only to a straight path.

SUMMARY

Accordingly, the present disclosure is directed to an apparatus and method for controlling lane following that substantially obviate one or more problems due to limitations and disadvantages of the related art.

An object of the present disclosure is to provide an apparatus and method for controlling lane following, which is capable of performing positive steering control while preventing collision of a subject vehicle with surrounding vehicles by setting a target trajectory of the subject vehicle using travel information of a preceding vehicle, even when only one of both lane marking lines of a lane in which the subject vehicle travels is recognized.

Additional advantages, objects, and features of the embodiments are set forth in part in the description which follows and in part should become apparent to those having ordinary skill in the art upon examination of the following or may be learned from practice of the embodiments. The objectives and other advantages of the embodiments may be realized and attained by the structure particularly pointed out in the written description and claims thereof as well as the appended drawings.

To achieve these objects and other advantages and in accordance with the purpose of the embodiments, as embodied and broadly described herein, a method for controlling lane following is disclosed. The method includes: acquiring front image information through a camera installed at an ego-vehicle during travel of the ego-vehicle; setting a target trajectory of the ego-vehicle using line information and travel information of a preceding vehicle extracted based on the image information; and calculating a steering torque to control steering of the ego-vehicle along the set target trajectory.

The acquiring the image information may include recognizing one of both lines of a travel lane in which the ego-vehicle currently travels.

The acquiring the image information may include recognizing the preceding vehicle traveling at least one of the travel lane of the ego-vehicle or a surrounding lane disposed adjacent to the travel lane.

The line information may include at least one of a first deviation distance between the recognized line and the ego-vehicle or a curvature of the travel lane.

The travel information of the preceding vehicle may include a lateral distance between the ego-vehicle and the preceding vehicle.

The setting the target trajectory may include calculating a second deviation distance between the recognized line and the preceding vehicle based on the first deviation distance, the curvature of the travel lane, and the lateral distance between the ego-vehicle and the preceding vehicle.

The setting the target trajectory may include setting the target trajectory by offsetting a minimum one of the first deviation distance and the second deviation distance from the recognized line in a lateral direction when only the preceding vehicle traveling in the travel lane is recognized.

The setting the target trajector may include calculating a lateral distance between plural preceding vehicles respectively traveling in the travel lane and the surrounding lane when the plural preceding vehicles are recognized, generating a virtual line based on the second deviation distance and the lateral distance between the plural preceding vehicles, and setting a centerline between the generated virtual line and the recognized line to the target trajectory.

The generating the virtual line may be executed when the lateral distance between the plural preceding vehicles is not shorter than a predetermined safe distance.

It should be understood that both the foregoing general description and the following detailed description of the present disclosure are by way of example and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and, along with the description, serve to explain the principle of the disclosure. In the drawings.

DETAILED DESCRIPTION

Hereinafter, embodiments of the present disclosure are described in detail with reference to the accompanying drawings. As various modifications can be made and diverse embodiments are applicable to the embodiments according to the concept of the present disclosure, specific embodiments are illustrated with reference to the accompanying drawings and described in detail herein. However, these specific embodiments should not be construed as limiting the embodiments according to the concept of the present disclosure, but should be construed as extending to all modifications, equivalents, and substitutes included in the concept and technological scope of the disclosure.

Terms including ordinal numbers such as first and/or second, etc. can be used to describe various elements, but the elements should not be limited by these terms. The terms are used merely for the purpose of distinguishing one element from another element. In addition, terms specifically defined herein in consideration of the configurations and functions in embodiments are used only to disclose embodiments without limiting the scope of embodiments. When a component, device, element or the like of the present disclosure is described as having a purpose or performing an operation, function, or the like, the component, device, or element should be considered herein as being "configured to" meet that purpose or to perform that operation or function.

It should be noted that terms used herein are merely used to describe a specific embodiment, not to limit the present disclosure. Incidentally, unless clearly used otherwise, singular expressions include a plural meaning. In this application, the terms "comprising," "including," or the like, are intended to express the existence of the characteristic, the numeral, the step, the operation, the element, the part, or the combination thereof, and does not exclude another characteristic, numeral, step, operation, element, part, or any combination thereof, or any addition thereto.

Unless defined otherwise, terms used herein including technological or scientific terms have the same meaning as generally understood by those having ordinary skill in the art to which the disclosure pertains. The terms used herein shall be interpreted not only based on the definition of any dictionary but also the meaning that is used in the field to which the disclosure pertains. In addition, unless clearly defined, the terms used herein shall not be interpreted too ideally or formally.

Hereinafter, lane following assist systems according to various embodiments of the present disclosure are described with reference to the accompanying drawings.

Figure 1:
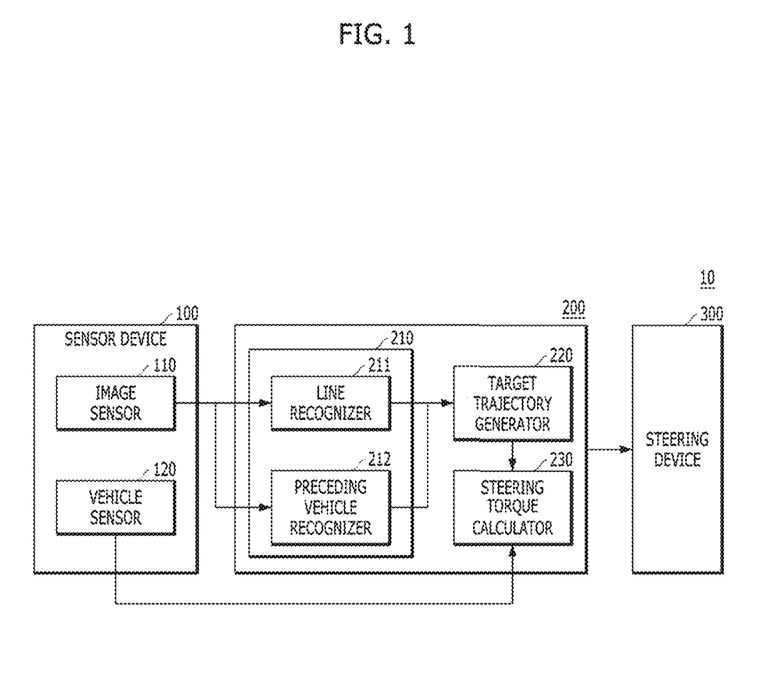
FIG. 1 is a block diagram schematically illustrating a configuration of a lane following assist system according to an embodiment of the present disclosure as a lane following control apparatus.

FIG. 1 is a block diagram schematically illustrating a configuration of a lane following assist system according to an embodiment of the present disclosure as a lane following control apparatus.

As illustrated in FIG. 1, the lane following assist system according to the illustrated embodiment, i.e., a lane following control apparatus 10, may include a sensor device 100, a lane following control device 200, and a steering device 300.

The sensor device 100 may include an image sensor 110 embodied through a camera mounted to an inside or outside of a vehicle, and a vehicle sensor 120 configured to measure information as to dynamic traveling characteristics of the vehicle.

The image sensor 110 may acquire image information photographed through a camera installed at a front side of the vehicle in a fixed state, and may send the image information to the lane following control device 200. The image sensor 110 may recognize information as to lane marking lines (hereinafter referred to as lines' for convenience), obstacles, preceding vehicles, etc. on a road through image processing for image information (noise removal, picture quality and saturation adjustment, file compression, etc.).

The vehicle sensor 120 may measure information as to dynamic traveling characteristics of the vehicle. The vehicle sensor 120 may include a speed sensor, an acceleration sensor, a steering angle sensor, a torque sensor, etc. The vehicle sensor 120 may sense a speed, an acceleration, a yaw rate, and a steering angle of the vehicle in a real time basis during travel of the vehicle. The vehicle sensor 120 may send the sensed results to a steering torque calculator 230, which is described later.

The lane following control device 200 may include an information collector 210, a target trajectory generator 220, and the steering torque calculator 230. The lane following control device 200 may analyze image information received from the sensor device 100, may set a target trajectory following a lane, in which the vehicle currently travels, based on the analyzed results, may calculate a steering torque for controlling steering along the set target trajectory, and may send the calculated steering torque to the steering device 300.

The information collector 210 may analyze front image information of the subject vehicle collected from the image sensor 110, and may extract line information of the lane, in which the subject vehicle currently travels, and travel information of a preceding vehicle, based on the analyzed results. The information collector 210 may include a line recognizer 211 and a preceding vehicle recognizer 212. Here, the subject vehicle may be referred to as an "ego-vehicle" with respect to surrounding vehicles.

The line recognizer 211 may recognize one of both lines of the lane, in which the ego-vehicle currently travels, (hereinafter referred to as a "travel lane" for convenience), based on the above-described image information, and may extract line information as to the recognized line. Here, the line information may include information as to at least one of a deviation distance between the ego-vehicle and the recognized line or a curvature of the travel lane.

For example, the line recognizer 211 may extract an image of a front road through an image processing procedure, and may recognize at least one line of the travel lane through Hough transform of the extracted image. Here, Hough transform means an algorithm configured to detect a line using specific points on two-dimensional image coordinates. In addition, the line recognizer 211 may measure a deviation distance between the ego-vehicle and the recognized line in a real time basis, using lateral position information of the image sensor 110 fixedly installed at the inside or outside of the ego-vehicle and coordinate information of the recognized line. The line recognizer 211 may also transform, into real road coordinates, a plurality of line recognition points detected in association with the recognized line, and may measure the curvature of the travel lane based on a linear and/or curve equation for the road coordinates.

The preceding vehicle recognizer 212 may recognize at least one preceding vehicle traveling in front of the ego-vehicle, and extract travel information of the preceding vehicle, based on the image information. Here, the travel information of the preceding vehicle includes information as to a distance between the ego-vehicle and the preceding vehicle in a lateral direction, and the lateral direction means a direction perpendicular to a travel direction of the ego-vehicle.

For example, the preceding vehicle recognizer 212 may recognize a rear surface of at least one preceding vehicle traveling in the travel lane of the ego-vehicle and may generate a virtual line extending from a center of the rear surface in the travel direction of the ego-vehicle. Thus, a lateral distance between the ego-vehicle and the preceding vehicle may be measured.

The target trajectory generator 220 may set a target trajectory of the ego-vehicle for lane following, using line information extracted through the line recognizer 211 and travel information of the preceding vehicle extracted through the preceding vehicle recognizer 212.

In this embodiment, the target trajectory generator 220 may execute operation thereof when the line recognizer 211 recognizes only one line of the travel lane of the ego-vehicle. For example, the target trajectory generator 220 may be applied to the case in which both lines of the travel line of the ego-vehicle cannot be recognized due to surrounding environmental factors (worse weather conditions, detection of a curved road, line disappearance, etc.).

In addition, the target trajectory generator 220 may secure stability in association with surrounding vehicles by measuring variation of a travel trajectory of the preceding vehicle detected through the preceding vehicle recognizer 212, and setting a target trajectory of the ego-vehicle based on the measured results. This is described later in more detail with reference to FIGS. 2 and 3.

The steering torque calculator 230 may calculate a steering torque to control steering of the ego-vehicle based on the dynamic traveling characteristics of the ego-vehicle measured through the vehicle sensor 212 and the target trajectory of the ego-vehicle set through the target trajectory generator 220. The steering torque calculator 230 may output an operation signal corresponding to the calculated steering torque to the steering device 300 and, as such, the ego-vehicle may be controlled to follow the lane in which the ego-vehicle currently travels. Here, dynamic traveling characteristics of a vehicle may be any one of a speed, an acceleration, a yaw rate, and a steering angle, or a combination thereof.

Hereinafter, operation of the lane following control device 200 is described in more detailed with reference to FIGS. 2 and 3.

Figure 2:
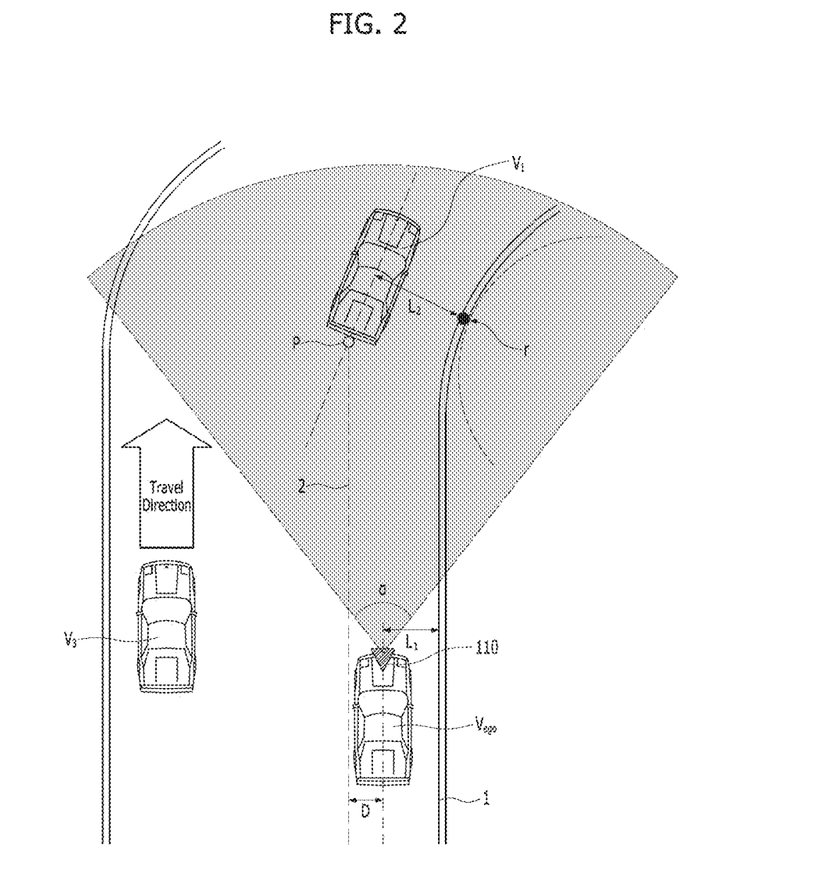
FIG. 2 is a view for explaining a method for setting a target trajectory using the lane following control apparatus according to the illustrated embodiment of the present disclosure when only a preceding vehicle traveling in a travel lane in front of a subject vehicle is recognized.

FIG. 2 is a view for explaining a method for setting a target trajectory using the lane following control apparatus according to the illustrated embodiment of the present disclosure when only a preceding vehicle traveling in the travel lane in front of the ego-vehicle is recognized.

Referring to FIG. 2, when image information having a predetermined angle of view a is provided through the image sensor 110 fixedly installed at the inside or outside of an ego-vehicle $V_{ego}$, the line recognizer 211 may recognize one of both lines of a lane, in which the ego-vehicle $V_{ego}$, currently travels. i.e., a right line 1, and the preceding vehicle recognizer 212 may recognize a preceding vehicle $V_1$ traveling in the travel lane of the ego-vehicle $V_{ego}$. Of course, such conditions are illustrative, and it should be appreciated by those having ordinary skill in the art that the line recognizer 211 may recognize a left line of the travel lane other than the right line in accordance with surrounding environmental factors.

The line recognizer 211 may measure a first deviation distance $L_1$ between the ego-vehicle $V_{ego}$ and the recognized right line 1 and a curvature r of a point on the right line 1 corresponding to a current position of the preceding vehicle $V_1$.

The preceding vehicle recognizer 212 may generate a virtual line 2 extending from a center P of a rear surface of the recognized preceding vehicle $V_1$ in a travel direction of the ego-vehicle $V_{ego}$, and may measure a lateral distance D between the ego-vehicle $V_{ego}$ and the preceding vehicle $V_1$.

The target trajectory generator 220 may calculate a second deviation distance $L_2$ between the preceding vehicle $V_1$ and the recognized right line 1 based on a state function. Variables of the state function may be the first deviation distance $L_1$ between the ego-vehicle $V_e$, and the recognized right line 1, the lateral distance D between the ego-vehicle $V_{ego}$ and the preceding vehicle $V_1$, and the curvature r of the travel lane. The second deviation distance $L_2$ may be expressed as in the following Expression 1.

$$L_2 = f(L_1, D, r) \qquad \text{[Expression 1]}$$

The target trajectory generator 220 may set a target trajectory of the ego-vehicle $V_{ego}$ by offsetting a minimum one of the measured first deviation distance $L_1$ and the calculated second deviation distance $L_2$ from the recognized right line 1 in a lateral direction through comparison between the first and second deviation distances $L_1$ and $L_2$.

For example, when the first deviation distance $L_1$ is determined to exceed the second deviation distance $L_2$ based on the compared results, the target trajectory generator 220 may set a lateral range of the target trajectory with respect to the recognized right line 1 such that the lateral range is reduced to the second deviation distance $L_2$. In this embodiment, the steering torque calculator 230 may calculate a steering torque for biased travel of the ego-vehicle $V_{ego}$ along the set target trajectory.

On the contrary, when the first deviation distance $L_1$ is determined not to be greater than the second deviation distance $L_2$ based on the compared results, the target trajectory generator 220 may set a lateral range of the target trajectory with respect to the recognized right line 1 such that the lateral range is maintained to be the first deviation distance $L_1$. In this embodiment, the steering torque calculator 230 may maintain the current steering state of the ego-vehicle $V_{ego}$.

Figure 3:
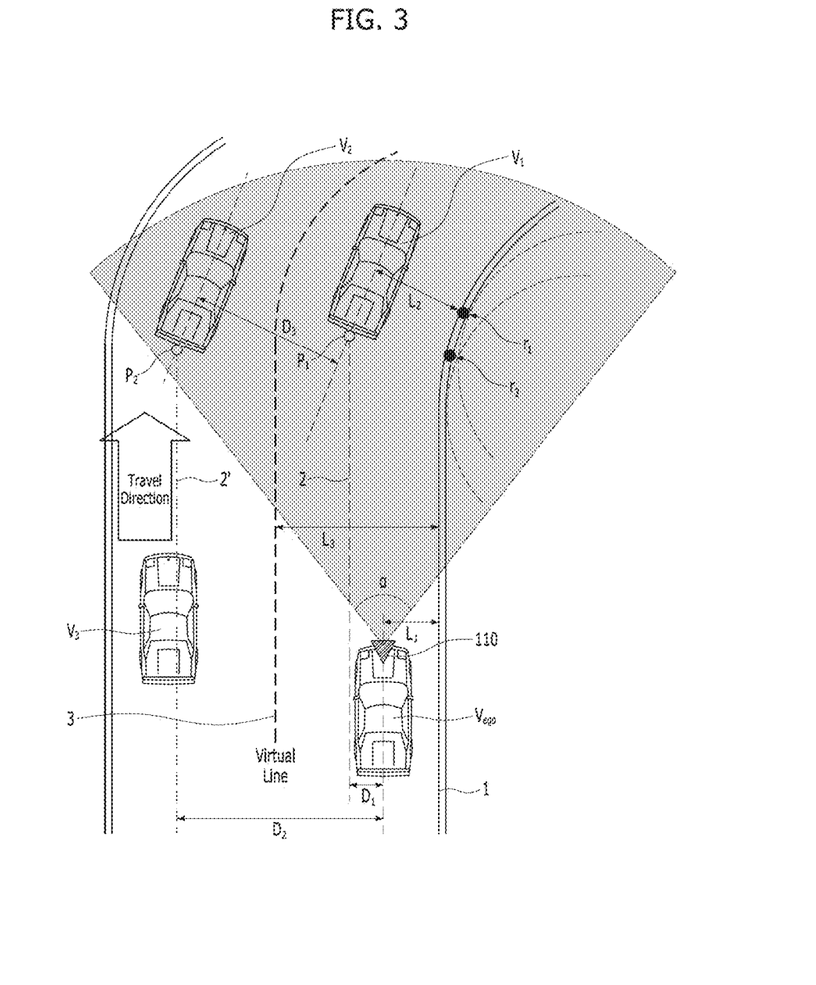
FIG. 3 is a view for explaining a method for setting a target trajectory using the lane following control apparatus according to the illustrated embodiment of the present disclosure when plural preceding vehicles traveling in the travel lane and surrounding lanes in front of the subject vehicle are recognized.

Meanwhile, FIG. 3 is a view for explaining a method for setting a target trajectory using the lane following control apparatus according to the illustrated embodiment of the present disclosure when plural preceding vehicles traveling in the travel lane and surrounding lanes in front of the ego-vehicle are recognized.

Referring to FIG. 3, when image information having a predetermined angle of view a is provided through the image sensor 110 fixedly installed at the inside or outside of an ego-vehicle $V_{ego}$, the line recogmzer 211 may recognize one of both lines of a lane, in which the ego-vehicle $V_{ego}$ currently travels, i.e., a right line 1. The preceding vehicle recognizer 212 may recognize a plurality of preceding vehicles $V_1$ and $V_2$ respectively traveling in the travel lane of the ego-vehicle $V_{ego}$ and a surrounding lane disposed adjacent to the travel lane.

The line recognizer 211 may measure a first deviation distance $L_1$ between the ego-vehicle $V_{ego}$ and the recognized right line 1, and may extract curvatures $r_1$ and $r_2$ of points on the right line 1 respectively corresponding to current positions of the plural preceding vehicles $V_1$ and $V_2$.

The preceding vehicle recognizer 212 may generate a virtual line 2 extending in a travel direction of the ego-vehicle $V_{ego}$ from a center $P_1$ of a rear surface of a first one of the plural preceding vehicles $V_1$ and $V_2$, which travels in the travel lane. i.e., the preceding vehicle $V_1$, and may measure a first lateral distance $D_1$ between the ego-vehicle $V_{ego}$ and the first preceding vehicle $V_1$. In addition, the preceding vehicle recognizer 212 may generate a virtual line 2' extending in the travel direction of the ego-vehicle $V_{ego}$ from a center $P_2$ of a rear surface of a second one of the plural preceding vehicles $V_1$ and $V_2$, which travels in the surrounding lane, i.e., the preceding vehicle $V_2$ The preceding vehicle recognizer 212 may measure a second lateral distance $D_2$ between the ego-vehicle $V_{ego}$ and the second preceding vehicle $V_2$.

The target trajectory generator 220 may calculate a second deviation distance $L_2$ between the first preceding vehicle $V_1$ and the recognized right line 1 based on a state function. Variables of the state function may be the first deviation distance $L_1$ between the ego-vehicle $V_{ego}$ and the recognized right line 1, the first lateral distance $D_1$ between the ego-vehicle $V_{ego}$ and the first preceding vehicle $V_1$, and the curvature $r_1$ of the point on the right line 1 corresponding to the current position of the first preceding vehicle $V_1$. The second deviation distance $L_2$ may be expressed as in the following Expression 2.

$$L_2 = f(L_1, D_1, r_1) \quad \text{[Expression 2]}$$

In addition, the target trajectory generator 220 may calculate a third deviation distance $L_1$ between the plural preceding vehicles $V_1$ and $V_2$ based on a state function. Variables of the state function may be the first deviation distance $L_1$ between the ego-vehicle $V_{ego}$ and the recognized right line 1, the second lateral distance $D_2$ between the ego-vehicle $V_{ego}$ and the second preceding vehicle $V_2$, and the curvature $r_2$ of the point on the right line 1 corresponding to the current position of the second preceding vehicle $V_2$. The third deviation distance $L_3$ may be expressed as in the following Expression 3.

$$L_3 = f(L_1, D_2, r_2) \quad \text{[Expression 3]}$$

In addition, the target trajectory generator 220 may determine whether or not the plural preceding vehicles $V_1$ and $V_2$ travel in the same lane, through comparison of a third lateral distance $D_3$ between the plural preceding vehicles $V_1$ and $V_2$ with a predetermined safe distance. Here, the predetermined safe distance means a minimum distance for preventing collision of plural vehicles respectively traveling in adjacent lanes with each other, and may be set to a default value of 1 m. Of course, the safe distance is illustrative, and may be variably adjusted using lane width information of a previous travel lane.

When the third lateral distance $D_3$ is not shorter than the predetermined safe distance, the target trajectory generator 220 determines that the first and second preceding vehicles $V_1$ and $V_2$ travel in different lanes and, as such, may generate a virtual line 3 based on the second deviation distance $L_2$ and the third lateral distance $D_3$. In this embodiment, the virtual line 3 is generated through creation of a virtual line laterally offset from the right line 1 sensed by the line recognizer 211 by a predetermined distance $L_3$. The predetermined distance $L_3$ may be calculated through the following Expression 4.

$$L_3 = L_2 + w \cdot D_3 \quad \text{[Expression 4]}$$

In Expression 4, "$L_2$" represents the deviation distance between the recognized right line 1 and the first preceding vehicle $V_1$, "$D_3$" represents the lateral distance between the first and second preceding vehicles $V_1$ and $V_2$, and "w" represents an arbitrary weight set between 0 and 1. For example, "w" may be 0.5.

The target trajectory generator 220 may set a centerline between the generated virtual line 3 and the right line 1 to a target trajectory of the ego-vehicle $V_{ego}$, and may calculate a steering torque for biased travel of the ego-vehicle $V_{ego}$ along the set target trajectory.

On the other hand, when the third lateral distance $D_3$ is shorter than the predetermined safe distance, the target trajectory generator 220 determines that the first and second preceding vehicles $V_1$ and $V_2$ travel in the same lane and, as such, may set a lateral control limit in the same manner as described in conjunction with FIG. 2.

The above-described lane following assist system according to the present disclosure, i.e., the lane following control apparatus 10, may secure stability of an ego-vehicle because steering control for lane following may be achieved even when only one line of a travel lane of the ego-vehicle is recognized due to worse weather conditions, line disappearance, and the like. For example, even when there is a surrounding vehicle $V_3$, which cannot be sensed by the preceding vehicle recognizer 212, as illustrated in FIGS. 2 and 3, the lateral range of the target trajectory may be variably adjusted within the range of the lane, in which the ego-vehicle currently travels, based on travel information of preceding vehicles $V_1$ and $V_2$. As such, collision of the ego-vehicle with the surrounding vehicle $V_3$ may be prevented. In addition, lane following control may be achieved using a front camera alone, without mounting of an expensive omnidirectional sensor. As such, manufacturing costs such as material costs may be reduced.

Figure 4:
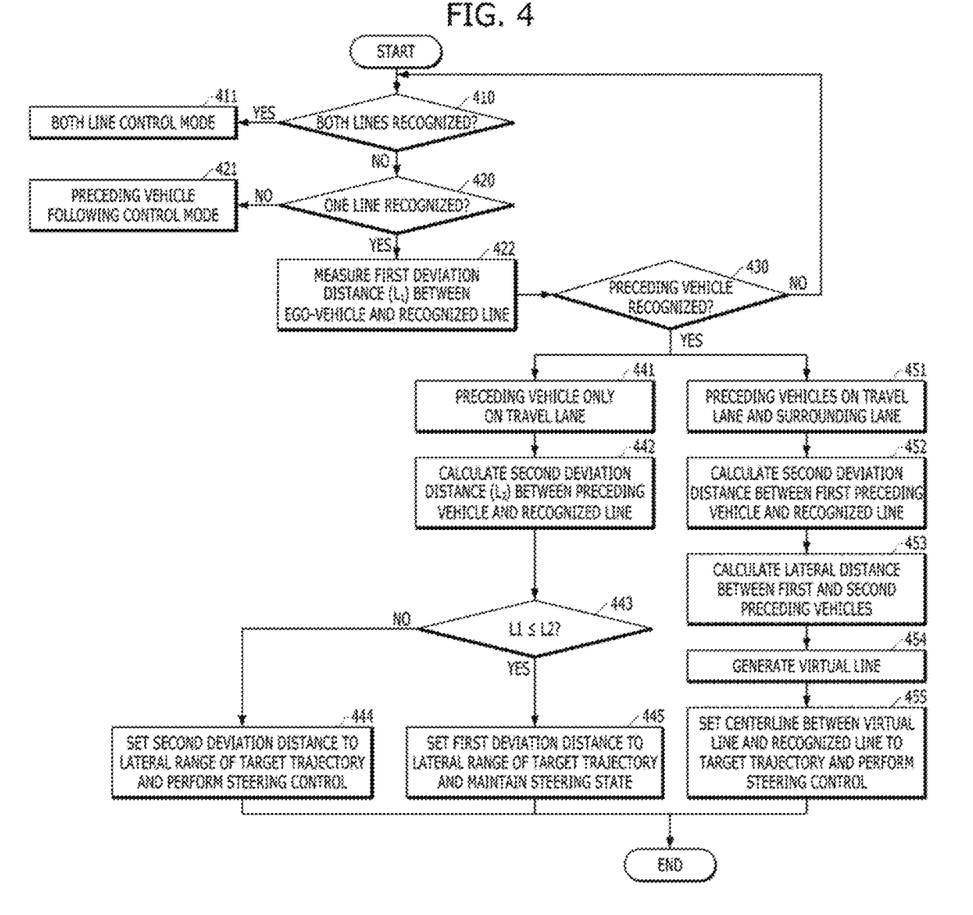
FIG. 4 is a flowchart for explaining a lane following control method of a vehicle according to an embodiment of the present disclosure.

FIG. 4 is a flowchart for explaining a lane following control method of a vehicle according to an embodiment of the present disclosure.

In accordance with the illustrated lane following control method, the lane following control apparatus 10 determines whether or not both lines of a travel lane in which an ego-vehicle currently travels have been recognized, based on image information acquired through the image sensor 110 (S410). When both lines of the travel lane have been recognized ("YES" in S410), a control mode transitions to a both line control mode. In this case, steering control for preventing deviation of the ego-vehicle from the two recognized lines is executed (S411).

On the other hand, when both lines of the travel lane are not recognized ("NO" in S410), whether or not any one of the lines has been recognized is determined (S420). When neither of the lines has been recognized ("NO" in S420), the control mode transitions to a preceding vehicle following control mode. In this case, steering control for the ego-vehicle to follow a target trajectory of a preceding vehicle traveling in front of the ego-vehicle is executed (S421).

On the other hand, when at least one line has been recognized ("YES" in S420), the lane following control apparatus 10 measures a first deviation distance $L_1$ between the ego-vehicle and the recognized line (S422).

Thereafter, the lane following control apparatus 10 determines whether or not at least one preceding vehicle traveling in front of the ego-vehicle has been recognized, based on the image information acquired through the image sensor 110 (S430). When no preceding vehicle has been recognized ("NO" in S430), the lane following control apparatus 10 returns a control routine thereof to step S410, and again attempts determination as to recognition of both lines or one line of the travel lane.

When at least one preceding vehicle has been recognized ("YES" in S430), setting of a target trajectory of the ego-vehicle may be varied in accordance with a lane in which the recognized preceding vehicle travels.

First, upon determining that there is a preceding vehicle only on the travel lane of the ego-vehicle (S441), the lane following control apparatus 10 calculates a second deviation distance $L_2$ between the preceding vehicle and the recognized line (S442). This has been described in detail in conjunction with FIG. 2 and, as such, no detailed description thereof is given, for avoidance of overlapping description.

Thereafter, the lane following control apparatus 10 compares the calculated second deviation distance $L_2$ with the extracted first deviation distance $L_1$ (S443).

When the first deviation distance $L_1$ is greater than the second deviation distance $L_2$ ("NO" in S443), the lane following control apparatus 10 sets the lateral range of the target trajectory to be reduced to the second deviation distance $L_2$, calculates a steering torque for biased travel of the ego-vehicle along the set target trajectory, and controls steering of the ego-vehicle based on the calculated steering torque (S444).

On the other hand, when the first deviation distance $L_1$ is equal to or shorter than the second deviation distance $L_2$ ("YES" in S443), the lane following control apparatus 10 sets the lateral range of the target trajectory to be maintained at the first deviation distance $L_1$, and maintains the current steering state of the ego-vehicle (S445).

Meanwhile, upon determining that there are plural preceding vehicles, i.e., first and second preceding vehicles, respectively in the travel lane of the ego-vehicle and a surrounding lane disposed adjacent to the travel lane (S451), the lane following control apparatus 10 calculates a second deviation distance $L_2$ between the recognized line and the first preceding vehicle (S452), and calculates a lateral distance between the first and second preceding vehicles (S453). This has been described in detail in conjunction with FIG. 3 and, as such, no detailed description thereof is given, for avoidance of overlapping description.

In addition, the lane following control apparatus 10 generates a virtual line based on the second deviation distance $L_2$ and the lateral distance while taking a predetermined safe distance into consideration (454). The lane following control apparatus 10 also sets a centerline between the virtual line and the recognized line to a target trajectory, and controls steering such that the ego-vehicle travels in a biased manner (S455).

As described above, the lane following control method of the vehicle according to the illustrated embodiment analyzes image information acquired through a camera installed at a front side of a vehicle, and variably adjusts a lateral range of a target trajectory based on the analyzed results and different travel situations (cf. S444, S445, and S455). Accordingly, it may be possible to prevent the vehicle from colliding with surrounding vehicles not sensed by the camera. In addition, there is an effect of reducing manufacturing costs because no expensive precise sensor is required.

The lane following control method of the vehicle according to the illustrated embodiment may be composed as a program to be executed in a computer, and may be stored in a recording medium that can be read by a computer. Examples of the recording medium that can be read by a computer may include a read only memory (ROM), a random access memory (RAM), a CD-ROM, a magnetic tape, a floppy disk, an optical data storage, etc.

The computer-readable recording medium is distributed to computer systems connected over a network, and computer-readable code may be stored and executed in a distributed manner. Furthermore, a functional program, code, and code segments for implementing the above-described method may be easily inferred by programmers in the technical field to which the embodiment pertains.

As apparent from the above description, in accordance with at least one embodiment of the present disclosure, it may be possible to expand application of a lane following assist system by setting a target trajectory of an ego-vehicle using travel information of a preceding vehicle, even when only one of both lines of a lane in which the ego-vehicle travels is recognized.

In addition, a lateral range of a target trajectory may be variably adjusted in accordance with a lateral position of a detected preceding vehicle and, as such, it may be possible to achieve steering control adjustable in accordance with surrounding vehicles, and to secure stability of the eco-vehicle and convenience of the driver.

Furthermore, lane following control may be achieved using a front camera alone, without mounting of an expensive omnidirectional sensor and, as such, manufacturing costs such as material costs may be reduced.

Although several embodiments have been described, other embodiments may be implemented in various forms. The technical contents of the above-described embodiments may be combined in various forms, so long as there is compatibility thereamong, and new embodiments may be implemented through such combination.

Those having ordinary skill in the art to which the present disclosure pertains can appreciate that the disclosure may be embodied in other specific forms without changing the technical spirit or essential characteristics. Therefore, the above detailed description should be understood as disclosing examples rather than being limiting in all aspects. The scope of the present disclosure should also be interpreted by the claims below. All modifications as would be derived from the equivalent concept intended to be included within the scope of the present disclosure should also be interpreted as falling within the scope of the disclosure.

What is claimed is:

1. A method for controlling lane following comprising:
   acquiring front image information through a camera installed at an ego-vehicle during travel of the ego-vehicle;
   setting a target trajectory of the ego-vehicle using line information and travel information of a preceding vehicle extracted based on the image information; and
   calculating a steering torque to control steering of the ego-vehicle along the set target trajectory,
   wherein the setting of the target trajectory includes setting the target trajectory by offsetting a minimum one of a first deviation distance and a second deviation distance in a lateral direction, based on recognizing a first preceding vehicle traveling a travel lane of the ego-vehicle, wherein the first deviation distance is between the ego-vehicle and one line of both lines of the travel lane, and wherein the second deviation distance is between the first preceding vehicle and the one line of the both lines of the travel lane.

2. The method according to claim 1, wherein the acquiring the image information comprises recognizing the one line of the both lines of the travel lane in which the ego-vehicle currently travels.

3. The method according to claim 2, wherein the acquiring the image information comprises recognizing the preceding vehicle traveling at least one of the travel lane of the ego-vehicle or a surrounding lane disposed adjacent to the travel lane, and wherein the preceding vehicle includes the first preceding vehicle.

4. The method according to claim 3, wherein the line information comprises at least one of a curvature of the travel lane or the first deviation distance between the recognized one line and the ego-vehicle.

5. The method according to claim 4, wherein the travel information of the preceding vehicle comprises a lateral distance between the ego-vehicle and the preceding vehicle.

6. The method according to claim 5, wherein the setting the target trajectory comprises calculating the second deviation distance based on the first deviation distance, the curvature of the travel lane, and the lateral distance between the ego-vehicle and the preceding vehicle.

7. The method according to claim 6, wherein the setting the target trajectory comprises:
calculating a lateral distance between plural preceding vehicles respectively traveling in the travel lane and the surrounding lane when the plural preceding vehicles are recognized;
generating a virtual line based on the second deviation distance and the lateral distance between the plural preceding vehicles; and
setting a centerline between the generated virtual line and the recognized line to the target trajectory.

8. The method according to claim 7, wherein the generating the virtual line is executed when the lateral distance between the plural preceding vehicles is not shorter than a predetermined safe distance.

9. A non-transitory recording medium on which an application program for executing the method described in claim 1 by a processor is written, the recording medium being readable by a computer.

10. An apparatus for controlling lane following comprising:
an information collector configured to acquire front image information through a camera installed at an ego-vehicle during travel of the ego-vehicle;
a target trajectory generator configured to set a target trajectory of the ego-vehicle using line information and travel information of a preceding vehicle extracted based on the image information; and
a steering torque calculator configured to calculate a steering torque to control steering of the ego-vehicle along the set target trajectory,
wherein the target trajectory generator is configured to set the target trajectory by offsetting a minimum one of a first deviation distance and a second deviation distance in a lateral direction, based on recognizing a first preceding vehicle traveling a travel lane of the ego-vehicle,
wherein the first deviation distance is between the ego-vehicle and one line of both lines of the travel lane, and
wherein the second deviation distance is between the first preceding vehicle and the one line of the both lines of the travel lane.

11. The apparatus according to claim 10, wherein the information collector comprises a line recognizer configured to recognize the one line of the both lines of the travel lane in which the ego-vehicle currently travels.

12. The apparatus according to claim 11, wherein the information collector comprises a preceding vehicle recognizer configured to recognize the preceding vehicle traveling at least one of the travel lane of the ego-vehicle or a surrounding lane disposed adjacent to the travel lane, and
wherein the preceding vehicle includes the first preceding vehicle.

13. The apparatus according to claim 12, wherein the line information comprises at least one of a curvature of the travel lane or the first deviation distance between the recognized one line and the ego-vehicle.

14. The apparatus according to claim 13, wherein the travel information of the preceding vehicle comprises a lateral distance between the ego-vehicle and the preceding vehicle.

15. The apparatus according to claim 14, wherein the target trajectory generator calculates the second deviation distance based on the first deviation distance, the curvature of the travel lane, and the lateral distance between the ego-vehicle and the preceding vehicle.

16. The apparatus according to claim 15, wherein, when plural preceding vehicles respectively traveling in the travel lane and the surrounding lane are recognized, the target trajectory generator calculating a lateral distance between the plural preceding vehicles, generates a virtual line based on the second deviation distance and the lateral distance between the plural preceding vehicles, and sets a centerline between the generated virtual line and the recognized line to the target trajectory.

17. The apparatus according to claim 16, wherein the target trajectory generator is configured to generate the virtual line when the lateral distance between the plural preceding vehicles is not shorter than a predetermined safe distance.

* * * * *